United States Patent
Villa et al.

(10) Patent No.: US 7,842,875 B2
(45) Date of Patent: Nov. 30, 2010

(54) SCHEME FOR PROVIDING AUDIO EFFECTS FOR A MUSICAL INSTRUMENT AND FOR CONTROLLING IMAGES WITH SAME

(75) Inventors: Mark Francis Villa, San Diego, CA (US); Gary M. Zalewski, Oakland, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 69 days.

(21) Appl. No.: 12/249,696

(22) Filed: Oct. 10, 2008

(65) Prior Publication Data

US 2009/0100988 A1 Apr. 23, 2009

Related U.S. Application Data

(60) Provisional application No. 60/981,375, filed on Oct. 19, 2007.

(51) Int. Cl.
*G10H 1/00* (2006.01)
(52) U.S. Cl. .............................. 84/609; 84/615; 84/616; 84/626
(58) Field of Classification Search ................... 84/609, 84/615, 616, 626, 649, 653, 662
See application file for complete search history.

(56) References Cited

U.S. PATENT DOCUMENTS

| | | | | |
|---|---|---|---|---|
| 3,736,832 | A * | 6/1973 | Franke et al. | 84/464 R |
| 4,006,970 | A * | 2/1977 | Slater et al. | 359/223.1 |
| 4,081,829 | A * | 3/1978 | Brown | 381/56 |
| 4,925,189 | A * | 5/1990 | Braeunig | 273/148 B |
| 5,005,459 | A * | 4/1991 | Adachi et al. | 84/453 |
| 5,278,347 | A * | 1/1994 | Konishi | 84/613 |
| 5,392,682 | A * | 2/1995 | McCartney-Hoy | 84/470 R |
| 5,414,256 | A * | 5/1995 | Gurner et al. | 250/221 |
| 5,442,168 | A * | 8/1995 | Gurner et al. | 463/36 |
| 5,475,214 | A * | 12/1995 | DeFranco et al. | 250/221 |
| 5,488,362 | A * | 1/1996 | Ullman et al. | 341/20 |

(Continued)

OTHER PUBLICATIONS

Patent Cooperation Treaty; "Notification of Transmittal of the International Search Report and the Written Opinion of the International Searching Authority, or the Declaration" issued in PCT/US08/79619, which corresponds to U.S. Appl. No. 12/249,696; mailed Dec. 22, 2008; 1 page.

(Continued)

*Primary Examiner*—David S. Warren
(74) *Attorney, Agent, or Firm*—Fitch, Even, Tabin & Flannery

(57) ABSTRACT

A method for use with a musical instrument includes receiving a signal representative of a sound produced by the musical instrument, receiving a selection of an audio effect from a wireless controller, applying the audio effect to the signal representative of a sound produced by the musical instrument, and providing an output signal representative of the audio effect applied to the sound produced by the musical instrument. Other methods include causing an image to be responsive to a signal representative of motions of the musical instrument, and causing an image to be responsive to a signal representative of sound produced by the musical instrument. A computer readable storage medium may store a computer program adapted to cause a processor based system to execute the steps of any one or more of these methods.

8 Claims, 10 Drawing Sheets

U.S. PATENT DOCUMENTS

| | | | |
|---|---|---|---|
| 5,554,033 A * | 9/1996 | Bizzi et al. | 434/247 |
| 5,557,424 A * | 9/1996 | Panizza | 386/97 |
| 5,616,078 A * | 4/1997 | Oh | 463/8 |
| 5,648,627 A * | 7/1997 | Usa | 84/600 |
| 5,684,259 A * | 11/1997 | Horii | 84/600 |
| 5,741,182 A * | 4/1998 | Lipps et al. | 463/36 |
| 5,757,360 A * | 5/1998 | Nitta et al. | 345/156 |
| 5,790,124 A * | 8/1998 | Fischer et al. | 345/629 |
| 5,890,116 A * | 3/1999 | Itoh et al. | 704/260 |
| 5,982,353 A * | 11/1999 | Gallery et al. | 345/156 |
| 6,030,290 A * | 2/2000 | Powell | 463/36 |
| 6,059,506 A * | 5/2000 | Kramer | 414/5 |
| 6,097,927 A * | 8/2000 | LaDue | 434/308 |
| 6,140,565 A * | 10/2000 | Yamauchi et al. | 84/600 |
| 6,183,365 B1 * | 2/2001 | Tonomura et al. | 463/36 |
| 6,262,355 B1 * | 7/2001 | Koch | 84/600 |
| 6,352,432 B1 * | 3/2002 | Tsai et al. | 434/307 A |
| 6,353,170 B1 * | 3/2002 | Eyzaguirre et al. | 84/603 |
| 6,390,923 B1 * | 5/2002 | Yoshitomi et al. | 463/43 |
| 6,424,944 B1 * | 7/2002 | Hikawa | 704/260 |
| 6,448,483 B1 * | 9/2002 | Loo et al. | 84/464 R |
| 6,524,186 B2 * | 2/2003 | Takatsuka et al. | 463/37 |
| 6,555,737 B2 * | 4/2003 | Miyaki et al. | 84/477 R |
| 6,717,042 B2 * | 4/2004 | Loo et al. | 84/464 R |
| 6,791,568 B2 * | 9/2004 | Steinberg et al. | 345/600 |
| 6,891,526 B2 * | 5/2005 | Gombert et al. | 345/156 |
| 6,898,759 B1 * | 5/2005 | Terada et al. | 715/202 |
| 6,909,420 B1 * | 6/2005 | Nicolas et al. | 345/156 |
| 6,971,882 B1 * | 12/2005 | Kumar et al. | 434/307 A |
| 7,056,216 B2 * | 6/2006 | Ohshima | 463/36 |
| 7,070,500 B1 * | 7/2006 | Nomi et al. | 463/7 |
| 7,116,328 B2 * | 10/2006 | Kawai et al. | 345/473 |
| 7,135,637 B2 * | 11/2006 | Nishitani et al. | 84/723 |
| 7,179,984 B2 * | 2/2007 | Nishitani et al. | 84/723 |
| 7,183,480 B2 * | 2/2007 | Nishitani et al. | 84/615 |
| 7,199,301 B2 * | 4/2007 | Prittwitz | 84/615 |
| 7,208,669 B2 * | 4/2007 | Wells et al. | 84/601 |
| 7,223,913 B2 * | 5/2007 | Knapp et al. | 84/722 |
| 7,335,105 B2 * | 2/2008 | Ueshima | 463/36 |
| 7,367,563 B2 * | 5/2008 | Yoseloff et al. | 273/292 |
| 7,378,585 B2 * | 5/2008 | McGregor | 84/600 |
| 7,446,253 B2 * | 11/2008 | Knapp et al. | 84/722 |
| 7,460,690 B2 * | 12/2008 | Cohen et al. | 382/103 |
| 7,601,904 B2 * | 10/2009 | Dreyfuss et al. | 84/600 |
| 2001/0015123 A1 * | 8/2001 | Nishitani et al. | 84/615 |
| 2002/0082077 A1 * | 6/2002 | Johnson et al. | 463/30 |
| 2002/0117046 A1 * | 8/2002 | Loo et al. | 84/636 |
| 2002/0189431 A1 * | 12/2002 | Loo et al. | 84/636 |
| 2003/0066413 A1 * | 4/2003 | Nishitani et al. | 84/615 |
| 2003/0167908 A1 * | 9/2003 | Nishitani et al. | 84/723 |
| 2005/0172780 A1 * | 8/2005 | Masuda | 84/100 |
| 2005/0183567 A1 * | 8/2005 | Aoki et al. | 84/722 |
| 2005/0190199 A1 * | 9/2005 | Brown et al. | 345/600 |
| 2006/0060068 A1 * | 3/2006 | Hwang et al. | 84/615 |
| 2006/0137511 A1 * | 6/2006 | McGregor | 84/478 |
| 2006/0144212 A1 * | 7/2006 | Hofmeister et al. | 84/724 |
| 2006/0156906 A1 * | 7/2006 | Haeker | 84/609 |
| 2006/0185502 A1 * | 8/2006 | Nishitani et al. | 84/615 |
| 2006/0196347 A1 * | 9/2006 | Iwata | 84/633 |
| 2006/0249008 A1 * | 11/2006 | Luther | 84/602 |
| 2007/0000375 A1 * | 1/2007 | Harrison | 84/737 |
| 2007/0163427 A1 * | 7/2007 | Rigopulos et al. | 84/609 |
| 2007/0227337 A1 * | 10/2007 | Yoshikawa et al. | 84/602 |
| 2007/0234885 A1 * | 10/2007 | Schmidt et al. | 84/722 |
| 2008/0034949 A1 * | 2/2008 | Nishitani et al. | 84/735 |
| 2008/0060499 A1 * | 3/2008 | Sitrick | 84/477 R |
| 2008/0096657 A1 * | 4/2008 | Benoist | 463/36 |
| 2008/0113797 A1 * | 5/2008 | Egozy | 463/35 |
| 2008/0250914 A1 * | 10/2008 | Reinhart et al. | 84/645 |
| 2008/0289482 A1 * | 11/2008 | Nakamura | 84/645 |
| 2009/0023123 A1 * | 1/2009 | Seo | 434/307 A |
| 2009/0100988 A1 * | 4/2009 | Villa et al. | 84/601 |
| 2009/0114079 A1 * | 5/2009 | Egan | 84/477 R |
| 2009/0188371 A1 * | 7/2009 | Chiu et al. | 84/314 R |
| 2009/0191932 A1 * | 7/2009 | Chiu et al. | 463/7 |
| 2009/0264199 A1 * | 10/2009 | Meske | 463/37 |
| 2009/0291756 A1 * | 11/2009 | McCauley et al. | 463/31 |
| 2010/0009749 A1 * | 1/2010 | Chrzanowski et al. | 463/35 |

OTHER PUBLICATIONS

Patent Cooperation Treaty; "International Search Report" issued in PCT/US08/79619, which corresponds to U.S. Appl. No. 12/249,696; mailed Dec. 22, 2008; 2 pages.

Patent Cooperation Treaty; "Written Opinion of the International searching Authority" issued in PCT/US08/79619, which corresponds to U.S. Appl. No. 12/249,696; mailed Dec. 22, 2008; 4 pages.

* cited by examiner

SCHEME FOR PROVIDING AUDIO EFFECTS FOR A MUSICAL INSTRUMENT AND FOR CONTROLLING IMAGES WITH SAME

CROSS-REFERENCE TO RELATED APPLICATIONS

This application claims the benefit of U.S. Provisional Patent Application No. 60/981,375, filed Oct. 19, 2007, entitled "SCHEME FOR PROVIDING AUDIO EFFECTS FOR A MUSICAL INSTRUMENT AND FOR CONTROLLING IMAGES WITH SAME," the entire disclosure of which is hereby incorporated by reference herein in its entirety.

BACKGROUND OF THE INVENTION

1. Field of the Invention

The present invention relates generally to musical instruments, and more specifically to sound effects used with musical instruments and image control.

2. Discussion of the Related Art

Musicians have been utilizing effects units to dynamically alter the sound of an instrument to create a specific listening environment when placed in the electrical signal path of an instrument. For example, electric guitars are often used in conjunction with foot effects pedals (sometimes called "stomp boxes"), which the guitarist presses with his or her foot to change the characteristics of the sounds produced by the guitar.

Tremolo, delay, echo, distortion, fuzz, overdrive, and wah-wah are a few examples of the different sound effects which may be applied by such an effects pedal or unit. In addition to electric guitars, effects pedals and units may also be employed by other types of musical instruments, such as acoustic guitars, bass guitars, pianos, keyboards, pipe organs, drums, harps, etc. Such effects may even be applied to the voice of a vocalist.

It is with respect to these and other background information factors that embodiments of the present invention have evolved.

SUMMARY OF THE INVENTION

Several embodiments of the invention provide a method for use with a musical instrument. In one embodiment, the method for use with a musical instrument comprises receiving a signal representative of a sound produced by the musical instrument, receiving a selection of an audio effect from a wireless controller, applying the audio effect to the signal representative of a sound produced by the musical instrument, and providing an output signal representative of the audio effect applied to the sound produced by the musical instrument.

In another embodiment, the invention can be characterized as a method for use with a musical instrument. The method for use with a musical instrument comprises receiving a signal representative of motions of the musical instrument as the musical instrument is played by a user, generating an image for display that is representative of the user playing the musical instrument, and causing the image to be responsive to the signal representative of motions of the musical instrument.

In a further embodiment, the invention may be characterized as a method for use with a musical instrument. The method for use with a musical instrument comprises receiving a signal representative of sound produced by the musical instrument as the musical instrument is played by a user, generating an image for display that is representative of the user playing the musical instrument, and causing the image to be responsive to the signal representative of sound produced by the musical instrument.

In some embodiments, the present invention provides a computer readable storage medium storing a computer program adapted to cause a processor based system to execute the steps of any one or more of the above-mentioned methods.

For example, in some embodiments the present invention provides a computer readable storage medium storing a computer program adapted to cause a processor based system to execute steps comprising: receiving a signal representative of a sound produced by a musical instrument; receiving a selection of an audio effect from a wireless controller; applying the audio effect to the signal representative of a sound produced by the musical instrument; and providing an output signal representative of the audio effect applied to the sound produced by the musical instrument. In some embodiments, the wireless controller is coupled to the musical instrument and includes a motion sensing capability, and the computer program is further adapted to cause the processor based system to execute steps comprising: receiving a signal from the wireless controller representative of motions of the musical instrument as the musical instrument is played by a user; and causing a displayable image representative of the user playing the musical instrument to be responsive to the signal representative of motions of the musical instrument.

As another example, in some embodiments the present invention provides a computer readable storage medium storing a computer program adapted to cause a processor based system to execute steps comprising: receiving a signal representative of sound produced by the musical instrument as the musical instrument is played by a user; generating an image for display that is representative of the user playing the musical instrument; and causing the image to be responsive to the signal representative of sound produced by the musical instrument.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

An effects pedal of the type described above typically sits on the floor with a large on/off switch to activate or deactivate the sound effect by foot. The controls for adjusting the effect are located on the pedal itself, which has a wired connection to the amplifier. As such, the musician must walk over to where the effect pedal is located to activate it, and even bend over and reach to the floor to adjust its control knobs, which is often inconvenient when the musician is "jamming."

Moreover, a conventional effects pedal generally corresponds to one type of sound effect. Therefore, if a user wishes to apply multiple audio effects to the sound of a musical instrument, several effects pedals are chained together through devices such as a pedal board. Depending on the number of effects pedals, the pedal board could be bulky and incorporate a large number of wires. While multi-effects units do exist that incorporate many different digital effects into a single unit, such units are dedicated units and are quite expensive. Furthermore, such units are also operated by a foot activated pedal board that the musician must stand next to when operating, which limits the musician's ability to roam freely while jamming.

Figure 1A:
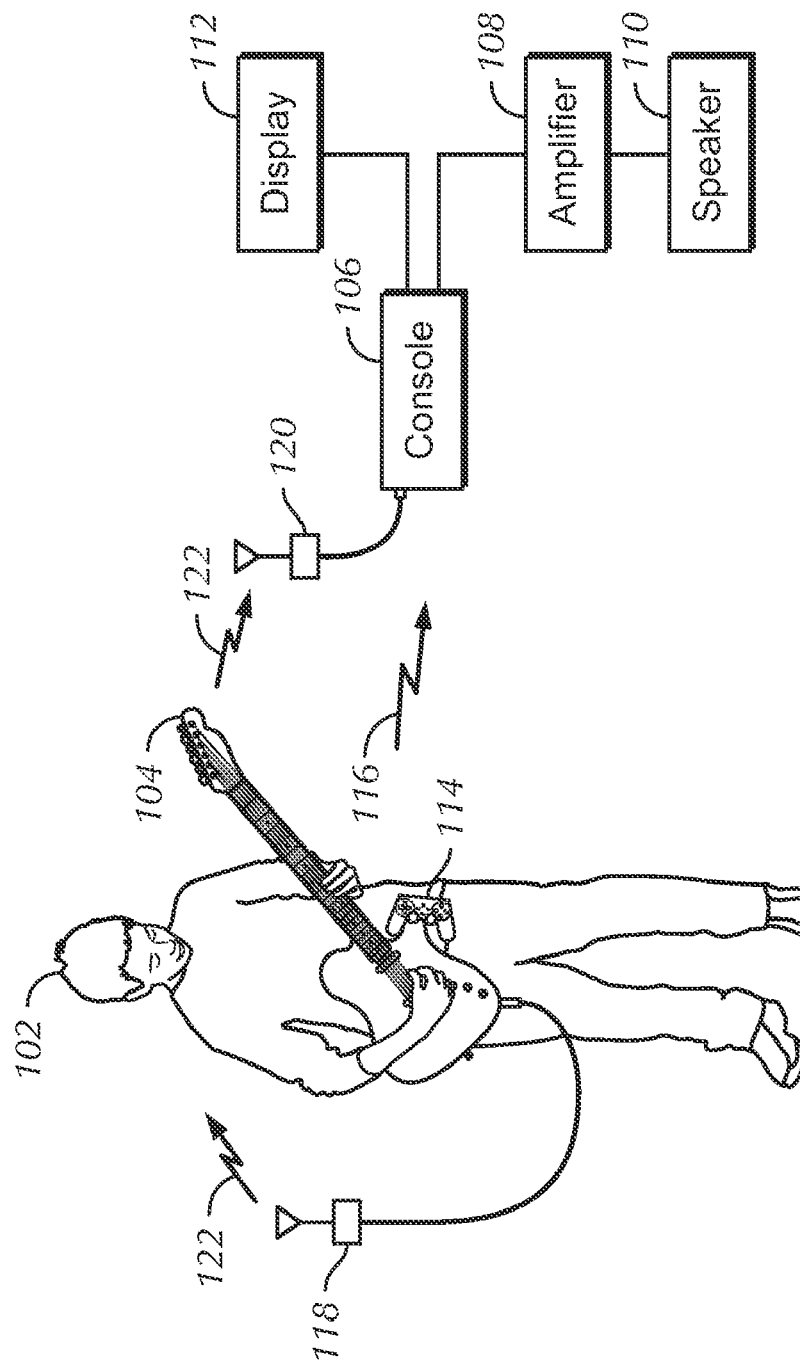
FIG. 1A is a diagram illustrating a system that operates in accordance with an embodiment of the present invention.

Referring to FIG. 1, there is illustrated a system that operates in accordance with an embodiment of the present invention. In general, the system allows a musician to activate and control sound effects without having to stand next to a pedal board. The system also allows the musician to use a console, such as a game or entertainment console, for the additional purpose of applying audio effects to the sound produced by his or her musical instrument.

Specifically, a musician or other user 102 plays a musical instrument, which in this example is an electric guitar 104. The output signal of the guitar 104 is provided to a console 106 via a wireless means, which will be discussed below. The console 106 provides audio output to an amplifier 108, which is coupled to a speaker 110. Thus, the sound produced by the guitar 104 is heard from the speaker 110, which may or may not be integrated with the amplifier 108. In addition, the console 106 provides video output to a display 112.

In this example the console 106 comprises a game console having a wireless controller 114 of a type normally associated with such game consoles. The wireless controller 114, which in this example comprises a game controller or "game pad," communicates with the game console 106 via a wireless channel 116. It should be understood that the console 106 may comprise any type of entertainment system or the like. As will be discussed below, in some embodiments the wireless controller 114 may also include a motion sensing capability.

In general, the illustrated embodiment involves the wireless controller 114 being placed on or near the guitar 104. In conjunction with the console 106, the user 102 may modify the characteristics of the guitar 104's sound by interacting with the wireless controller 114. Because the controller 114 has a wireless mode, the user 102 need not stand in a fixed location to modify the guitar 104's sounds. As such, the illustrated system overcomes some of the disadvantages and inconveniences of the above-described conventional effects pedals which are located in a fixed location on the floor.

Furthermore, the illustrated system does not require a dedicated effects unit for applying sound effects to the output of the musical instrument 104. Namely, the console 106 includes a first function, such as a video game console, and software is added to the console 106 to produce the sound effects as a second function. In this way, a game controller is integrated with a musical instrument so that the wireless controller/game console combination is used to modify sound from a musical instrument. In some embodiments, the hardware is all off-the-shelf As such, the required space and cost to the user 102 may be reduced because the two functions are performed with the single console 106.

Figure 1B:
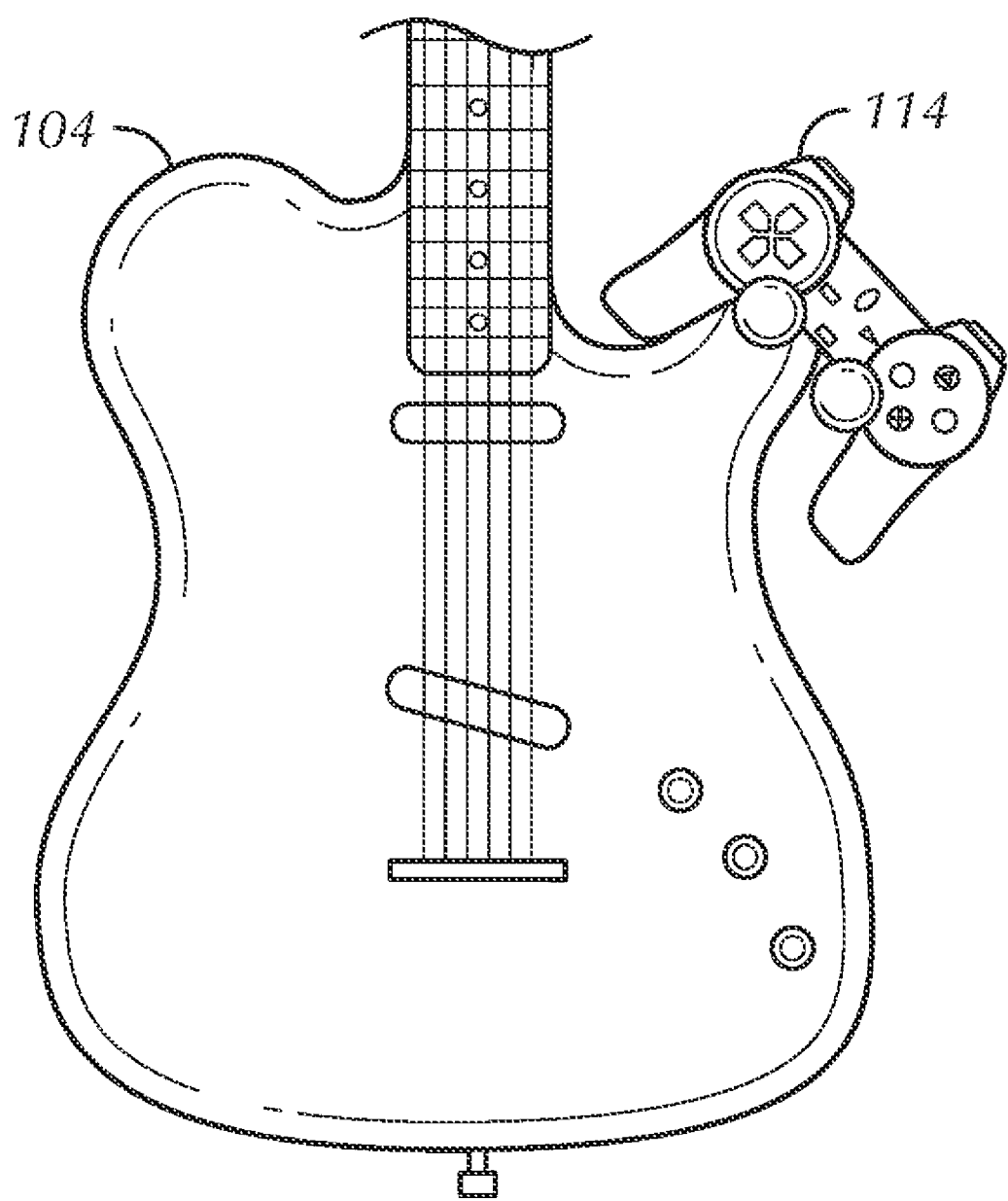
FIG. 1B is a diagram illustrating a musical instrument configured in accordance with an embodiment of the present invention.

The wireless controller 114 is preferably attached to the guitar 104. Since the controller 114 is wireless, small, and lightweight, it can be attached to the body of the guitar 104, within reach of the player's hands, acting as a "hand pedal" for controlling guitar effects, as depicted in FIG. 1B. The controller may take a position sometimes taken by traditional electric guitar control knobs and switches, or nearby that location, or another convenient location. This way, the controller 114 is easily accessible to the guitarist's hands, and the console/controller combination may be used to replace or supplement foot pedals often used with electric guitars. Depending on the type of guitar used, an attachment clip or the like may or may not be used for attaching the controller 114 to the guitar 104. By way of example, a conventionally shaped game controller fits well on the lower bout of a Telecaster style electric guitar.

Using a video game controller in this manner is unique, since such controllers are expected to be held in the user's hands and used for playing video games and are not associated with musical instruments and live music. The controller need not control any visual display, but in some embodiments it does, which will be discussed below.

The output signal of the electric guitar 104 may be provided to the console 106 (FIG. 1A) in a number of different ways. As illustrated, a wireless system may be employed whereby the guitar 104 communicates with the console 106 through a transmitter 118 coupled to the output of the guitar 104, a receiver 120 coupled to an input on the console 106, and a wireless channel 122. The input on the console 106 may comprise any type of input, such as a USB input, which is common on game consoles. With this arrangement, the output is taken from the wireless receiver 120 and fed into the input on the console 106, with the output passed on down the effects chain. The receiver 120 may be a separate component as shown or integrated with the console 106. Alternatively, the output of the guitar 104 may be plugged directly into the USB input on the console 106, using any necessary means for analog-to-digital conversion, if needed. The user 102 then starts up the console 106 and software and begins to play as usual, selecting effects by interacting with the wireless controller 114 attached to the guitar 104.

Figure 2:
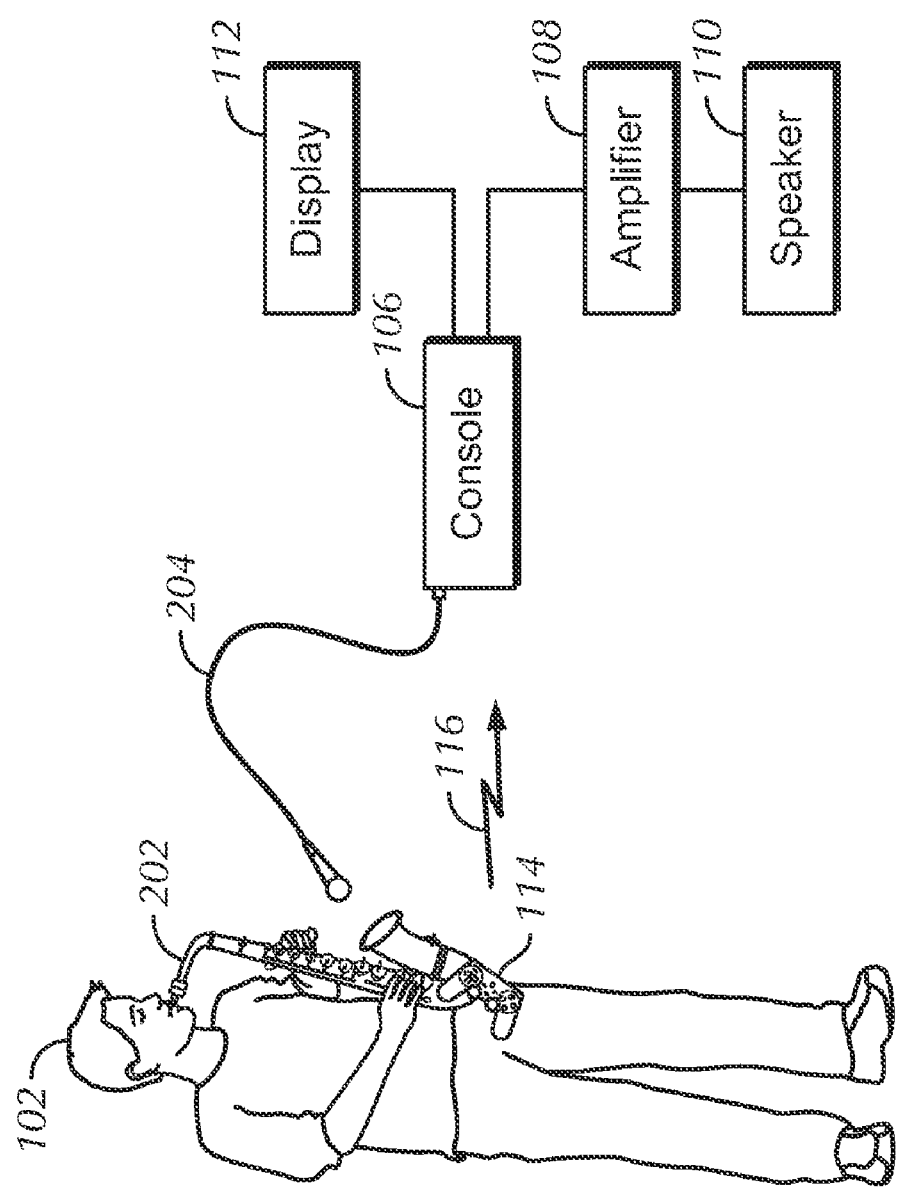
FIG. 2 is a diagram illustrating a system that operates in accordance with another embodiment of the present invention.

Referring to FIG. 2, there is illustrated another way that the output of a musical instrument may be provided to the console 106. In this example the musical instrument played by the user 102 is a saxophone 202, but any type of instrument may be used. The sound produced by the saxophone 202 is provided to the console 106 by using a microphone 204 pointed at the instrument or its monitor. The microphone 204 interfaces with the console 106 through the standard audio interface or alternatively through a USB interface. Thus, the microphone 204 may comprise a USB microphone that can be plugged directly into a USB input of the console 106. Although the microphone 204 is illustrated as a separate component from the console 106, it should be appreciated that the microphone 204 may be integrated with the console 106 or another peripheral thereof, such as a camera.

The wireless controller 114 is attached to the saxophone 202 in any convenient location. Similar to as described above, this gives the user 102 easy access to the controller 114 for selecting the effects that are applied to the saxophone 202's sound by the console 106. As such, the user 102 will not have to walk over to, or stand next to, a pedal board sitting on the floor.

The above-described system provides a convenient way for a musician to use a game or entertainment console to apply audio effects to the sound produced by his or her musical instrument. Namely, the musician simply needs a console, its controller, software that is run by the console to create the audio effects, and a microphone or other means described above for providing the musical instrument's sound to the console. As such, the system bridges the gap between game playing and "serious" music play and permits the dual use of one console. Integrating the above-described audio effects capability into such game and entertainment consoles will provide audio effects to many musicians who could not otherwise afford conventional dedicated effects units. This is because there is already more widespread use of game consoles than there is for many dedicated audio effects units and devices. Furthermore, such integration makes the effects gear transportable since game and entertainment consoles are easily transportable.

Figure 3:
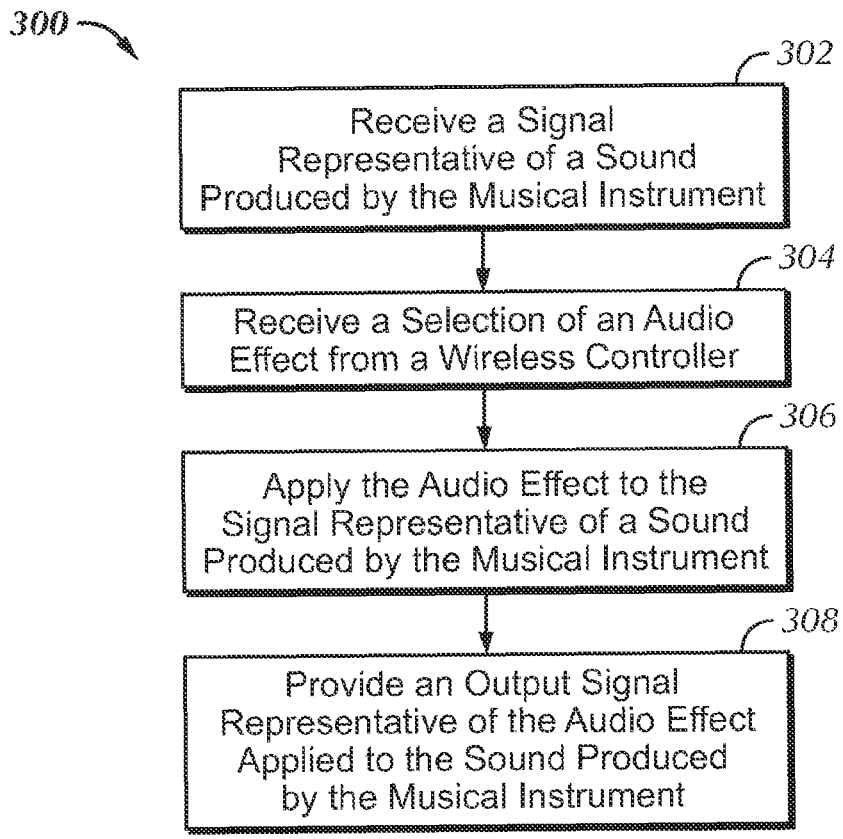
FIG. 3 is a flow diagram illustrating a method for use with a musical instrument in accordance with an embodiment of the present invention.

Referring to FIG. 3, there is illustrated an example of a method 300 that may be performed by the console 106 in accordance with an embodiment of the present invention. The method 300 may be used in implementing one or more of the embodiments described above.

The method 300 begins in step 302 in which a signal representative of a sound produced by a musical instrument is received. As described above, the signal may be received in many different ways. For example, the signal may be received directly from the output of an electronic instrument, such as an electric guitar or keyboard, or the signal may be received using a wireless device such as is described above, or the signal may be received using a microphone.

In addition, it should be well understood that the signal may be received from many different types of musical instruments. While the use of foot pedals is fairly standard with electric guitars, the nature of the setup described herein will work with anything from harmonicas, to trombones, to electronic keyboards, to acoustic guitars, to violins, etc. The wireless controller's small size and light weight allows it to be used in a similar role on a wide variety of instruments. Furthermore, a microphone may be used with any musical instrument to sense the sound produced by the musical instrument and convey an electrical signal representative of the sound to the console. Therefore, the systems described herein may be used on instruments and devices other than guitars.

In step 304, a selection of an audio effect is received from a wireless controller. Namely, the wireless controller typically comprises a series of buttons and devices, such as analog joy sticks. The buttons and analog joy sticks may be mapped to various sound effects. For example, an analog joy stick may be used to control the level or other parameter of a certain sound effect. The sound effects are activated when the user presses the corresponding button or operates the corresponding analog joy stick. A signal indicating which effect has been selected is sent from the wireless controller to the console. In this way the wireless controller acts as a guitar "hand pedal".

In some embodiments, the controller need not be attached to the musical instrument or even controlled by the person playing the musical instrument. For example, in some embodiments the controller may be operated by another user in an online community, which will be discussed below. Furthermore, in some embodiments, a traditional foot pedal could be modified to use game controller-like controls and to send wireless control signals back to a console or other master control device. Or, the modified foot pedal could take the input of the musical instrument directly and send the combined wireless signal back to the console or other master control device, similar to a wireless microphone setup.

In step 306, the selected audio effect is applied to the signal representative of a sound produced by the musical instrument. In some embodiments, software is run by the console to apply the audio effect to the signal representative of the sound produced by the musical instrument. The number of functions and audio effects such software can apply is essentially limitless. For example, the software could create basic audio effects such as distortion, fuzz, digital delay, down machine, echo, reverb, wah-wah, guitar sample controller, chorus, flange, etc. Such effects are often used with electric guitars and other instruments, and the manner in which such effects are implemented in software is well-known in the art. As such, a console of the type described herein can be used to create these and other audio effects. This allows the console to act as a digital effects unit and applies the user selected sound effects to the audio signal representative of the sound produced by the musical instrument. In some embodiments, a combination of hardware and software is used by the console to apply the audio effect to the signal representative of the sound produced by the musical instrument.

In step 308, an output signal is provided that is representative of the selected audio effect applied to the sound produced by the musical instrument. The output signal may be provided to an amplifier or the like. The sound may then be heard from a speaker that is coupled to the amplifier. The speaker may or may not be integrated with the amplifier, and multiple amplifiers and/or speakers may be used.

Thus, the method 300 provides a way for a device, such as a console, to provide audio effects for a musical instrument. This function may be in addition to another function provided by the device, such as for example a game console function, entertainment system function, etc.

It was mentioned above that the console 106 provides video output to a display 112 (FIGS. 1 and 2). In some embodiments, the user 102 is provided with the ability to control one or more images displayed on the display 112. The images may be controlled in a number of different ways, such as for example by sensing the motions of the musical instrument or in response to the sound produced by the musical instrument.

Figure 4:
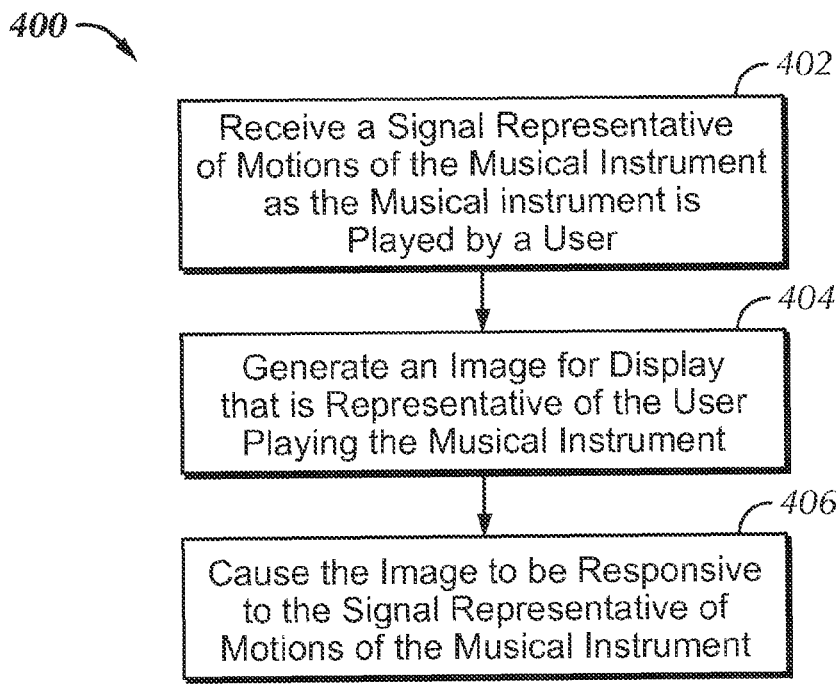
FIG. 4 is a flow diagram illustrating a method for use with a musical instrument in accordance with another embodiment of the present invention.

For example, referring to FIG. 4 there is illustrated an example of a method 400 that may be performed by the console 106 in accordance with an embodiment of the present invention. The method 400 begins in step 402 in which a signal is received that is representative of motions of the musical instrument as the musical instrument is played by a user. By way of example, this step may be implemented with the wireless controller described above having motion sensing capability. Namely, as the user plays the musical instrument, the user will typically move around, which will cause the musical instrument to also move around. If the wireless controller is coupled to the musical instrument as described above, a motion sensing capability in the wireless controller will sense the motions of the musical instrument. A signal that is representative of the motions of the musical instrument is then sent to the console.

In some embodiments, the wireless controller may comprise a hand-held controller that has the ability to have its three-dimensional movements tracked. Such tracking may be performed in many different ways. For example, such tracking may be performed through inertial, video, acoustical, or infrared analysis. In some embodiments, the wireless controller may be configured to sense motions such as tilt, yaw, roll, acceleration, and position. Motion sensing capabilities are built into some commercially available game controllers and game pads, such as for example the SixAxis™ wireless controller available from Sony Computer Entertainment Inc. of Japan. It should be well understood that the wireless controllers described herein are not limited to a six point axis of motion but may implement other types of motion, such as a free motion sensing unit. In step 404 an image for display is generated that is representative of the user playing the musical instrument. The image may comprise any type of image. In some embodiments, the image comprises an avatar playing a representation of the musical instrument. In some embodiments, the image comprises an actual picture or likeness of the user playing the musical instrument. The image may then be displayed on a display.

In step 406 the image is caused to be responsive to the signal representative of motions of the musical instrument. For example, the motion sensing capabilities of the wireless controller may be used to control and/or manipulate the image displayed on the display. Where the image comprises an avatar, the motion sensing capabilities of the wireless controller may be used to control and/or manipulate the avatar.

In some embodiments, the motion sensing capability of the wireless controller allows for the tracking of the movements of the musical instrument as played by the user. The motion signals are received by the console, processed, and then applied to the image representative of the user playing the musical instrument. In other embodiments, the console applies the received motion signals to the image representative of the user using inverse kinetics along with the known physical constraints of the musical instrument. Where the image comprises an avatar, the avatar is responsive to the signal representative of motions of the musical instrument.

In some embodiments, this step is implemented by causing the representation of the musical instrument played by the avatar to substantially track the motions of the musical instrument played by the user. In addition, the avatar may be caused to move with the movements of the representation of the musical instrument played by the avatar. In this way, the wireless controller motion sensors can map the user's moves into avatar moves.

Figure 5A:
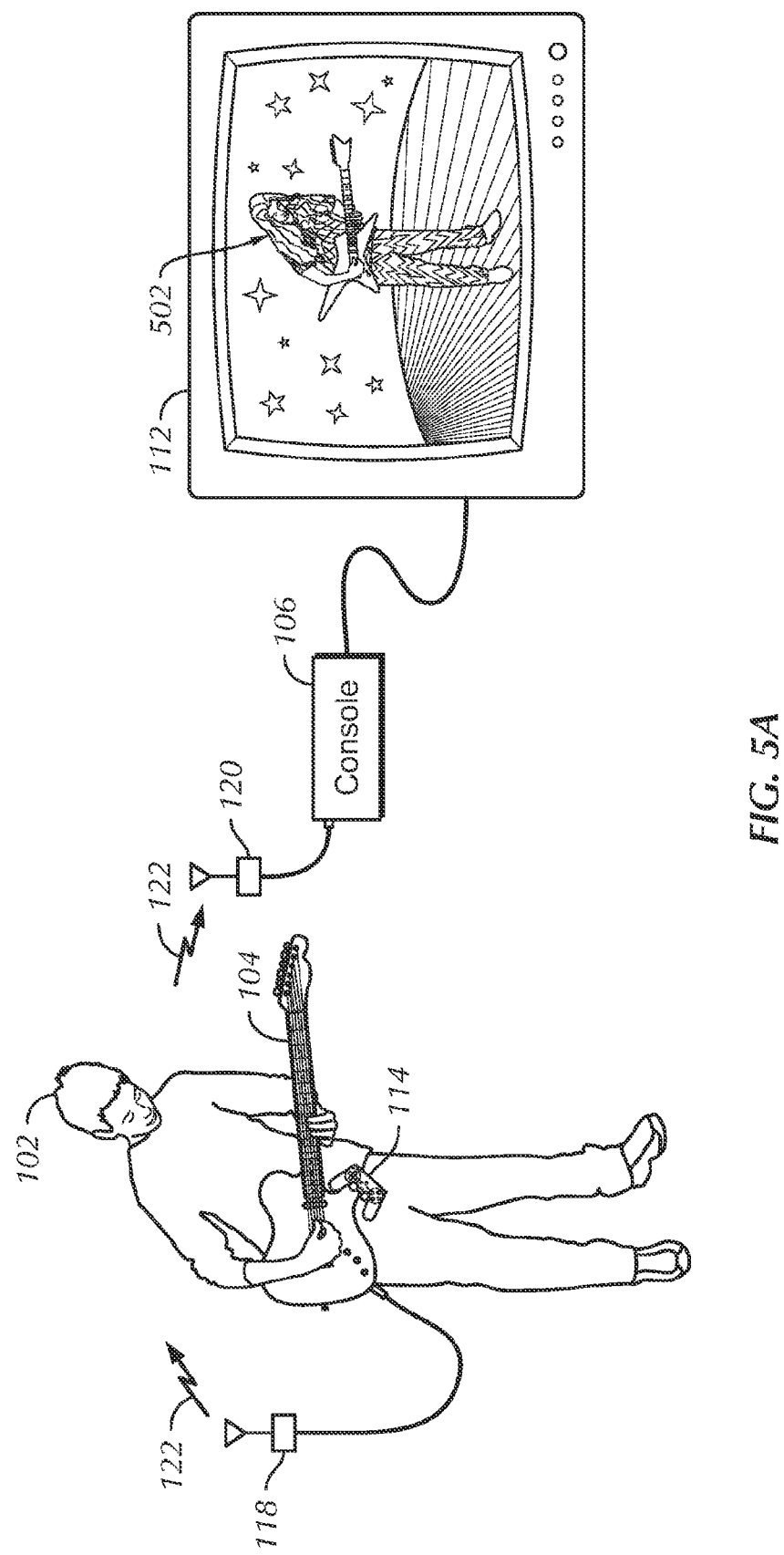
FIGS. 5A, 5B, and 5C are diagrams illustrating an example application of the method shown in FIG. 4.
Figure 5B:
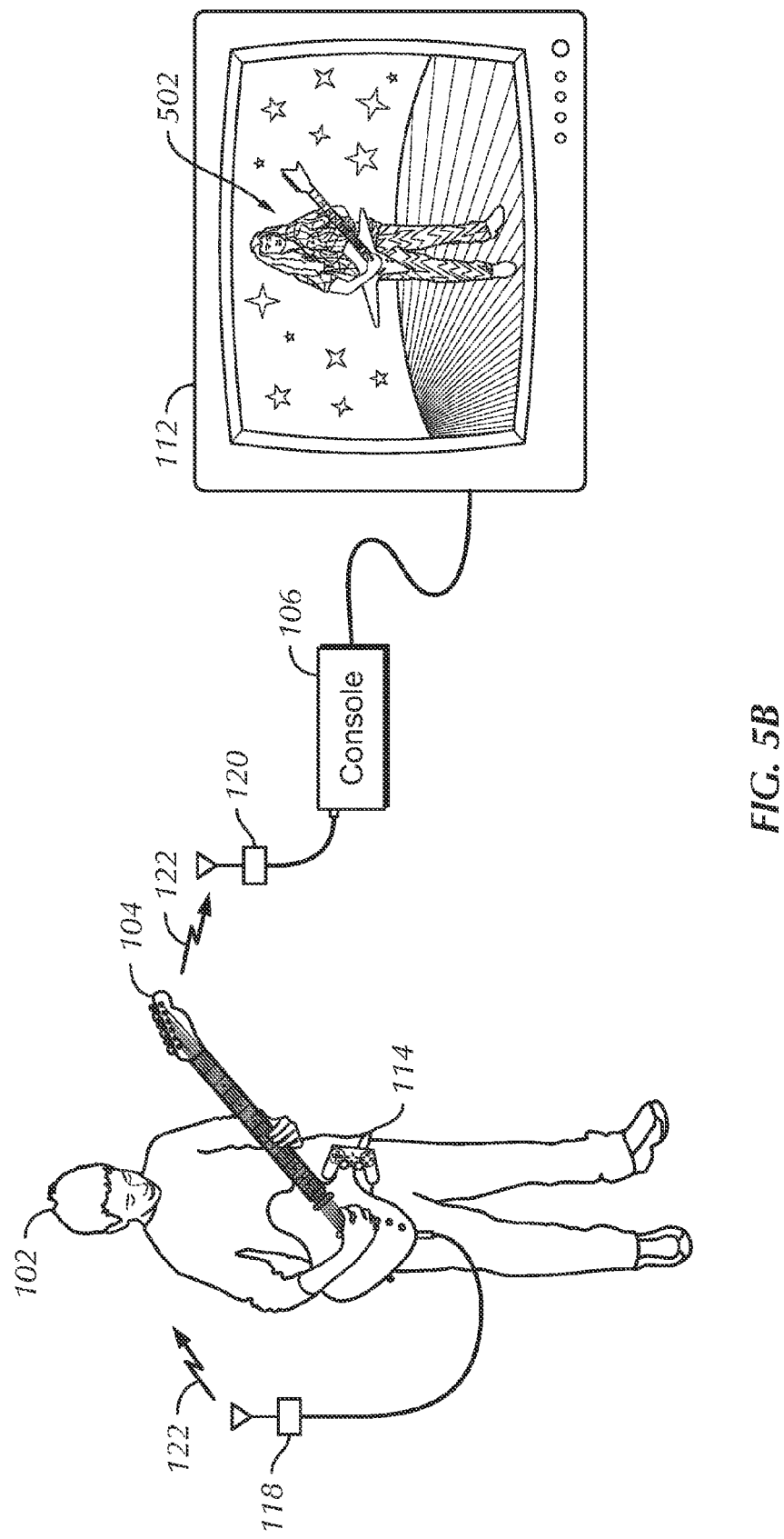
Figure 5C:
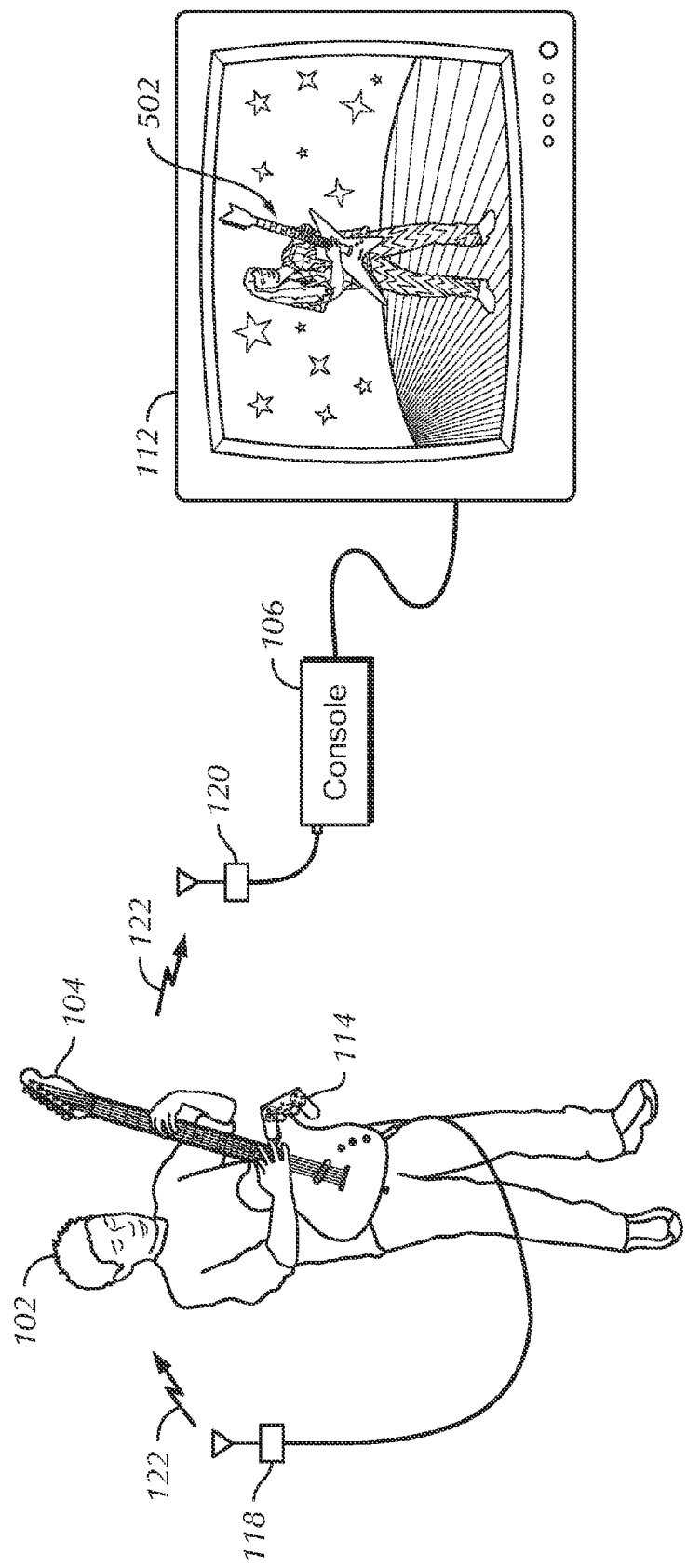

Referring to FIGS. 5A, 5B and 5C, there is illustrated an example application of the method 400. The figures illustrate how an avatar may be controlled in response to the motion sensing capability of a wireless controller.

Namely, in FIG. 5A the user 102 holds the guitar 104 such that it is pointed down to the floor. The console 106 generates an image 502 that is representative of the user 102 playing the guitar 104. The image 502 is displayed on the display 112. In the illustrated embodiment, the image 502 comprises an avatar playing a representation of the guitar.

The wireless controller 114 in this embodiment includes a motion sensing capability. The console 106 receives signals from the wireless controller 114 that are representative of the motions of the guitar 104.

For example, in FIG. 5B the user 102 bends upward and the guitar 104 correspondingly moves upward as well. This motion of the guitar 104 is sensed by the wireless controller 114. The console 106 causes the image 502 displayed on the display 112 to be responsive to this sensed motion of the guitar 104. Namely, the avatar playing a representation of the guitar also moves upward.

In FIG. 5C the user 102 leans back and the guitar 104 is correspondingly directed up. This motion of the guitar 104 is sensed by the wireless controller 114. The console 106 causes the image 502 to be responsive to this sensed motion of the guitar 104. Namely, the avatar playing a representation of the guitar also leans back and the guitar is directed up.

Thus, as illustrated, images may be controlled by sensing the motions of the musical instrument. In some embodiments, the motion sensing capabilities of a wireless controller may be used for implementing other functions. For example, the axis of the above-mentioned SixAxis™ wireless controller are especially well suited for locating sound produced by multiple speakers attached to a console. Namely, the motions sensed by the controller may be used for adjusting the volume of sound or distributing the sound among multiple speakers.

Figure 6:
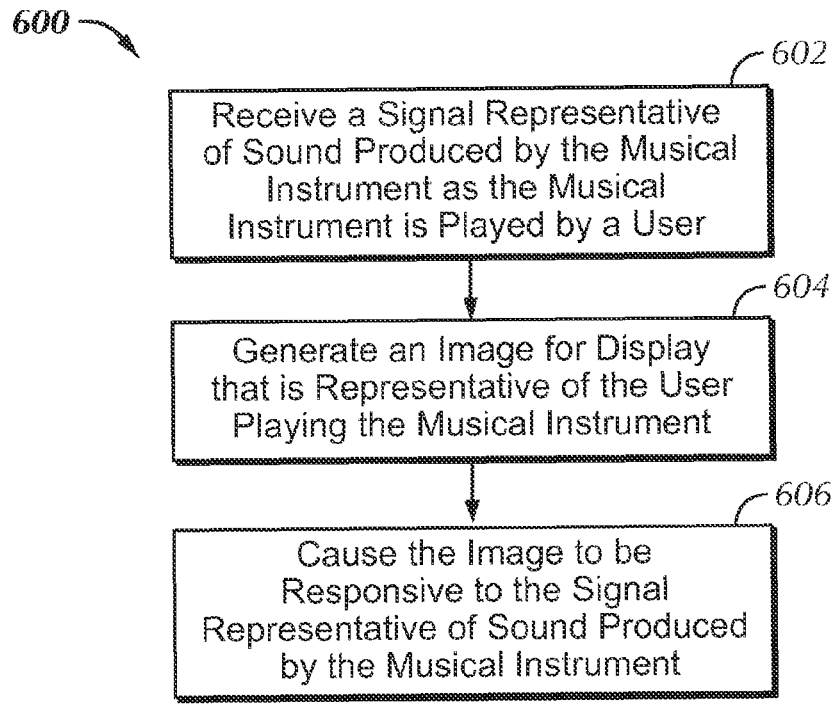
FIG. 6 is a flow diagram illustrating a method for use with a musical instrument in accordance with another embodiment of the present invention.

It was mentioned above that images may also be controlled in response to the sound produced by the musical instrument. For example, referring to FIG. 6, there is illustrated an example of a method 600 that may be performed by the console 106 in accordance with an embodiment of the present invention. The method 600 begins in step 602 in which a signal is received that is representative of sound produced by the musical instrument as the musical instrument is played by a user. As previously described above, the signal representative of sound may be received in many ways. The signal may be received directly from the output of an electronic instrument, such as an electric guitar or keyboard, or the signal may be received using a wireless device such as described with reference to FIG. 1, or the signal may be received using a microphone as described in FIG. 2.

In step 604, an image for display is generated that is representative of the user playing the musical instrument. The image may comprise any type of image. For example, in some embodiments, the image comprises an avatar playing a representation of the musical instrument. In other embodiments, the image comprises an actual picture of the user playing the musical instrument. In further embodiments, the image comprises a representative close up view illustrating how the user is playing the musical instrument. For example, the representative close up image may depict the user's manipulation of the musical instrument, such as for example the strumming or fingering employed by a user playing a guitar, or the finger position required to produce a specific note of a musical instrument, or the user's technique in blowing into the mouthpiece of a wind instrument, such as a saxophone, flute, clarinet, etc. In some embodiments, the user's manipulation of the musical instrument may include the user's breathing technique and/or the manner in which the user takes deep breaths as he or she blows into the mouthpiece of a wind instrument.

In step 606, the image is caused to be responsive to the signal representative of sound produced by the musical instrument. For example, the console 106 may use the received sound signal to control and/or manipulate the image displayed on the display. Where the image comprises an avatar, the console 106 uses the received sound signal to control and/or manipulate the avatar.

The image may be controlled and/or manipulated in many different ways. For example, in some embodiments the image may be moved or manipulated in a certain manner in response to a certain note or chord being played by the musical instrument. In such embodiments, the console receives the signal representative of the sound produced by the musical instrument and then deciphers what note or chord is being played. Such deciphering of the note or chord from the received signal may be performed using known techniques. After deciphering the note or chord being played, the console then moves and/or manipulates the image in a manner corresponding to the deciphered note or chord.

In some embodiments, the console deciphers what user manipulation of the musical instrument, such as the fingering, blowing, or other technique, is required to create the sound produced by the musical instrument. The console then applies the deciphered user manipulation of the musical instrument to an image, such as an avatar. In this scenario the avatar mimics the deciphered user manipulation of the musical instrument on a representation of the musical instrument. For example, the user may be playing a drum kit with the embodiments described above. Each of the components of a drum kit has a unique sound. As such, when the user plays the drum kit, the console receives a signal representative of the sound produced by the drum kit and deciphers which drum or cymbal was used to create the sound. The console then deciphers the movements required by the image, such as an avatar, to create the received sound signal and applies the movements to the avatar. By deciphering the fingering or other type of user manipulation required to produce a specific sound, the avatar may mimic the user's fingering or other manipulation.

Figure 7A:
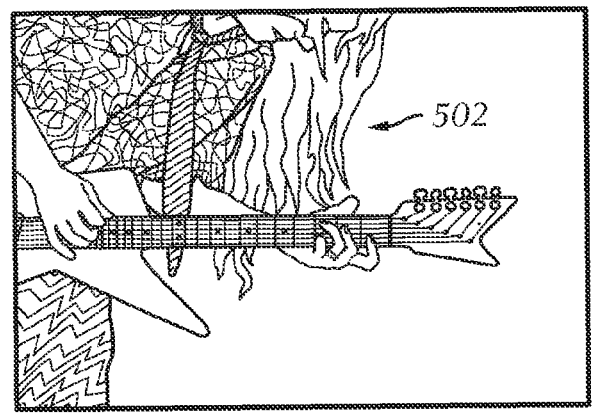
FIGS. 7A, 7B, and 7C are diagrams illustrating an example application of the method shown in FIG. 6.
Figure 7B:
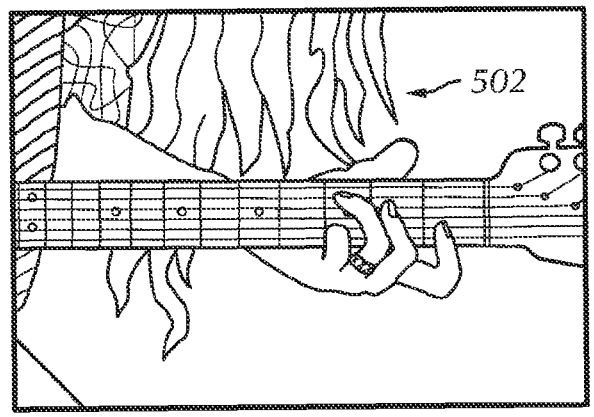
Figure 7C:
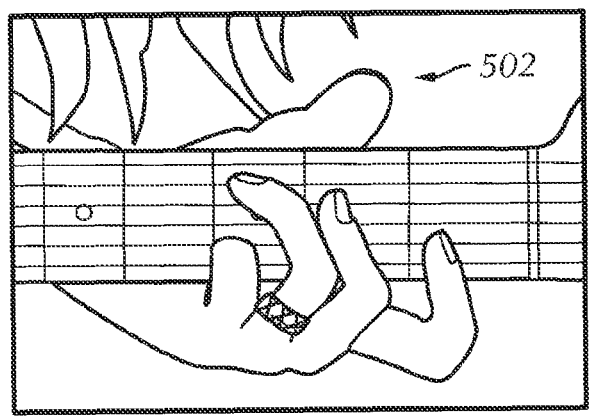

Referring to FIGS. 7A, 7B, and 7C, there is illustrated another example of how an image may be controlled and/or manipulated to mimic a user's musical instrument fingering in response to the signal representative of sound produced by the musical instrument. Specifically, in FIG. 7A the console 106 generates an image 702 that is representative of a user playing a guitar. In this example the image 702 comprises an avatar playing a guitar. The console 106 receives the signal representative of the sound produced by the guitar and deciphers what note or chord is being played. The console 106 then deciphers what musical instrument fingering is required to create the sound produced by the guitar. The avatar is then caused to mimic the deciphered musical instrument fingering on the representation of the guitar. In this way the image 702 is caused to be responsive to the signal representative of sound produced by the guitar.

In the illustrated example, the console 106 has determined that the sound signal corresponds to the chord, C-major, and has deciphered the corresponding fingering. As such, the console 106 manipulates the image 702 such that the avatar applies the fingering corresponding to the C-major chord to the representation of the guitar. In some embodiments, the user may be given the option to zoom-in on the image 702 in order to view the precise fingering, as is illustrated by FIGS. 7B and 7C. These views may also be optionally controlled by the user.

As with many musical instruments, there may be a plurality of different fingerings which corresponds to the same note or chord. In some embodiments, the user may select which fingering is the preferred setting for the avatar to mimic. Furthermore, in some embodiments, either one or both of the steps of deciphering what user manipulation of the musical instrument is required to create the sound produced by the musical instrument, and applying the deciphered user manipulation of the musical instrument to an image, may be performed in real-time. In some embodiments, either one or both of these steps may involve the use of post-processing techniques.

Figure 8:
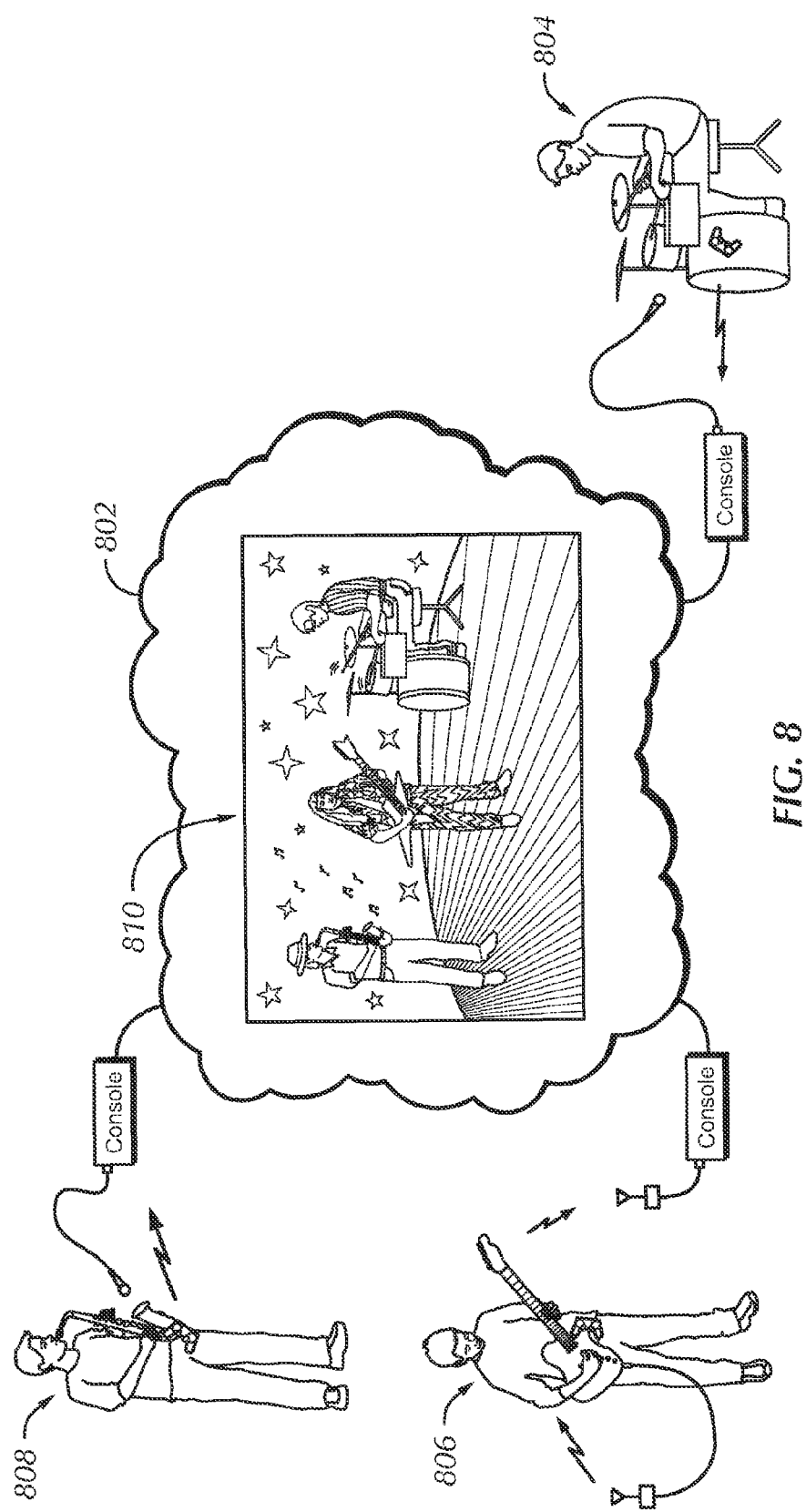
FIG. 8 is a diagram illustrating a system that operates in accordance with an embodiment of the present invention.

In some embodiments, one or more of the above-described systems which allow a user to control sound effects with a "hand pedal" and control the movements of an avatar or other image may be implemented online to allow for peer-to-peer "jamming." For example, referring to FIG. 8, there is illustrated a system 800 that operates in accordance with an embodiment of the present invention. As depicted, multiple users 804, 806 and 808 each employ an embodiment of the present invention. Users 804 and 808 use an embodiment similar to that illustrated in FIG. 2 by attaching a microphone to send signals representative of sound to the console. On the other hand, user 806 uses an embodiment similar to that illustrated in FIG. 1 by using a transmitter and receiver to send sound signals to the console.

Each of the users 804, 806 and 808 may interact or "jam" together online by connecting each console in the system to a network 802. The consoles may be connected to the network 802 through either wired or wireless connections. The users 804, 806 and 808 may each be at different physical locations, or the same physical location.

An image 810 is generated and made available on the network 802 and embodies what each user 804, 806 and 808 may view on his or her own display (not shown) as they are interacting together. For example, in the scenario where the users 804, 806 and 808 connect to the network 802 to participate in online peer-to-peer "jamming," the image 810 would comprise a representation of each user playing his or her respective musical instrument. In some embodiments, the image 810 comprises avatars for each of the users 804, 806 and 808. By connecting to the network 802, the users 804, 806 and 808 may participate in a virtual jamming session where each user may control the sound produced by his or her musical instrument and the specific movements of his or her avatar.

In some embodiments, the users 804, 806 and 808 may interact together through an online community made available on the network 802. In general, an online community allows users to create an avatar that interacts with the avatars of other users, such as by playing games and socializing in various rooms, lounges, apartments, etc. An example of an online community is PlayStation Home™, which is being developed by Sony Computer Entertainment Inc. of Japan.

In such embodiments, other users of the online community may be permitted to view the image 810. The users 804, 806 and 808 may jam together in a virtual music room, and other users in the online community may go into the room and watch. In this sense, the image 810 may comprise an illustration of the users 804, 806 and 808 interacting in the virtual music room and interacting with the other users. The users 804, 806 and 808 may even participate in a virtual concert held in a virtual music room or hall where other users ("the audience") witness the performance by connecting to the online community. With the various embodiments described above, the users 804, 806 and 808 ("the performers") may directly control the sound produced by their musical instruments and the specific movements of their avatars to create a richer virtual performance.

In addition, in some embodiments co-players in an audience may control the effects of the individual musical instruments in a virtual concert with other users. The audience may do this by utilizing their own wireless controllers to apply audio effects to the individual musical instruments, similar to as described hereinabove. In another embodiment, multiple controllers may be utilized by a user as a "mixing board," where the user may be "GJ" (Game Jockey).

Figure 9:
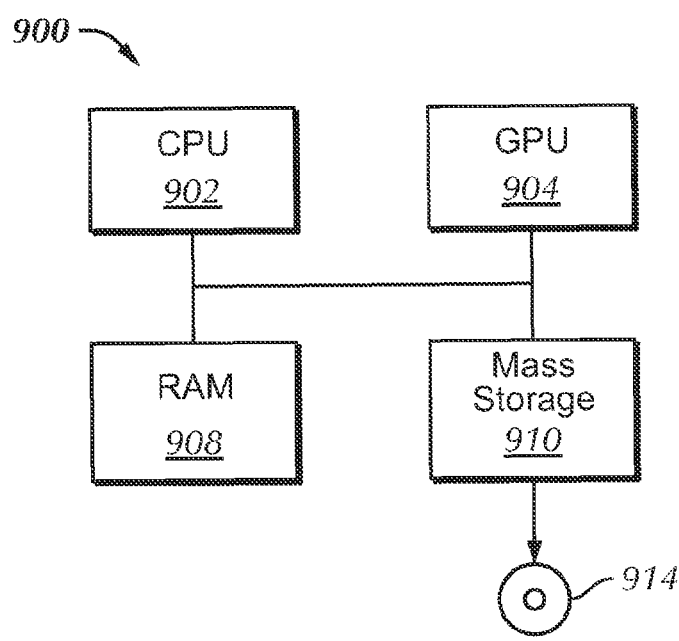
FIG. 9 is a block diagram illustrating a processor based system that may be used to run, implement and/or execute the methods and/or techniques shown and described herein in accordance with embodiments of the present invention.

The methods and techniques described herein may be utilized, implemented and/or run on many different types of systems. Referring to FIG. 9, there is illustrated a system 900 that may be used for any such implementations. One or more components of the system 900 may be used for implementing any system or device mentioned above, such as for example any of the above-mentioned consoles, game consoles, entertainment systems, etc. However, the use of the system 900 or any portion thereof is certainly not required.

By way of example, the system 900 may include, but is not required to include, a central processing unit (CPU) 902, a graphics processing unit (GPU) 904, a random access memory (RAM) 908, and a mass storage unit 910, such as a disk drive. The system 900 may be coupled to, or integrated with, any of the other components described herein, such as the display 112, amplifier 108, speaker 110, receiver 120, and/or microphone 204. The system 900 comprises an example of a processor based system. The CPU 902 and/or GPU 904 may be used to execute or assist in executing the steps of the methods and techniques described herein, and various program content, images, avatars, representations, communities, and interfaces may be rendered on the display 112.

The mass storage unit 910 may include or comprise any type of computer readable storage or recording medium or media. The computer readable storage or recording medium or media may be fixed in the mass storage unit 910, or the mass storage unit 910 may optionally include removable storage media 914, such as a digital video disk (DVD), Blu-ray disc, compact disk (CD), USB storage device, floppy disk, or other media. By way of example, the mass storage unit 910 may comprise a disk drive, a hard disk drive, flash memory device, USB storage device, Blu-ray disc drive, DVD drive, CD drive, floppy disk drive, etc. The mass storage unit 910 or removable storage media 914 may be used for storing code that implements the methods and techniques described herein.

Thus, removable storage media 914 may optionally be used with the mass storage unit 910, which may be used for storing code that implements the methods and techniques described herein, such as code for creating the above-described audio effects. However, any of the storage devices, such as the RAM 908 or mass storage unit 910, may be used for storing such code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 908 or mass storage unit 910, may be used for storing any needed database(s).

In some embodiments, one or more of the embodiments, methods, approaches, and/or techniques described above may be implemented in a computer program executable by a processor based system. By way of example, such processor based system may comprise the processor based system 900, or a computer, entertainment system, game console, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described audio effects, visual effects, motion sensing effects, etc. As another example, such computer program may be used for implementing any type of tool or similar utility that uses any one or more of the above described embodiments, methods, approaches, and/or techniques. In some embodiments, the computer program may comprise a video game, role-playing game (RPG), or other computer simulation. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer readable storage medium storing a computer program adapted to cause a processor based system to execute steps comprising: receiving a signal representative of a sound produced by a musical instrument; receiving a selection of an audio effect from a wireless controller; applying the audio effect to the signal representative of a sound produced by the musical instrument; and providing an output signal representative of the audio effect applied to the sound produced by the musical instrument. In some embodiments the wireless controller is coupled to the musical instrument and includes a motion sensing capability, and the computer program is further adapted to cause the processor based system to execute steps comprising: receiving a signal from the wireless controller representative of motions of the musical instrument as the musical instrument is played by a user; and causing a displayable image representative of the user playing the musical instrument to be responsive to the signal representative of motions of the musical instrument.

As another example, in some embodiments the present invention provides a computer readable storage medium storing a computer program adapted to cause a processor based system to execute steps comprising: receiving a signal representative of sound produced by the musical instrument as the musical instrument is played by a user; generating an image for display that is representative of the user playing the musical instrument; and causing the image to be responsive to the signal representative of sound produced by the musical instrument.

The above description is not to be taken in a limiting sense, but is made merely for the purpose of describing the general principles of exemplary embodiments. The scope of the invention should be determined with reference to the claims.

What is claimed is:

1. A computer readable storage medium storing a computer program adapted to cause a processor based system to execute steps comprising:
    receiving a signal representative of a sound produced by a musical instrument;
    receiving a selection of an audio effect from a wireless controller, wherein the wireless controller is coupled to the musical instrument and includes a motion sensing capability;
    applying the audio effect to the signal representative of a sound produced by the musical instrument;
    providing an output signal representative of the audio effect applied to the sound produced by the musical instrument;
    receiving a signal from the wireless controller representative of motions of the musical instrument as the musical instrument is played by a user; and causing a displayable image representative of the user playing the musical instrument to be responsive to the signal representative of motions of the musical instrument.

2. The computer readable storage medium of claim 1, wherein:
the wireless controller comprises a game controller; and
the steps of receiving a signal, receiving a selection, applying the audio effect, and providing an output signal are performed by a game console.

3. The computer readable storage medium of claim 1, wherein:
the image comprises an avatar playing a representation of the musical instrument; and
the step of causing the displayable image representative of the user playing the musical instrument to be responsive to the signal representative of motions of the musical instrument comprises:
causing the representation of the musical instrument played by the avatar to substantially track the motions of the musical instrument as the musical instrument is played by the user; and
causing the avatar to move with movements of the representation of the musical instrument played by the avatar.

4. The computer readable storage medium of claim 1, wherein the computer program is further adapted to cause the processor based system to execute a step comprising:
displaying in an online community images that are representative of one or more additional players interacting with the displayable image that is representative of the user playing the musical instrument.

5. A computer readable storage medium storing a computer program adapted to cause a processor based system to execute steps comprising:
receiving a signal representative of sound produced by a musical instrument as the musical instrument is played by a user;
generating an image for display that is representative of the user playing the musical instrument;
causing the image to be responsive to the signal representative of sound produced by the musical instrument;
wherein the computer program is further adapted to cause the processor based system to execute steps comprising:
receiving a signal representative of motions of the musical instrument as the musical instrument is played by a user; and
causing the image to be responsive to the signal representative of motions of the musical instrument.

6. The computer readable storage medium of claim 5, wherein:
the image comprises an avatar playing a representation of the musical instrument; and
the step of causing the image to be responsive to the signal representative of sound produced by the musical instrument comprises:
deciphering what user manipulation of the musical instrument is required to create the sound produced by the musical instrument; and
causing the avatar to mimic the deciphered user manipulation of the musical instrument on the representation of the musical instrument.

7. The computer readable storage medium of claim 5, wherein the computer program is further adapted to cause the processor based system to execute a step comprising:
displaying in an online community the image that is representative of the user playing the musical instrument.

8. The computer readable storage medium of claim 5, wherein the computer program is further adapted to cause the processor based system to execute a step comprising:
displaying in the online community images that are representative of one or more additional players interacting with the image that is representative of the user playing the musical instrument.

\* \* \* \* \*